(12) United States Patent  (10) Patent No.: US 8,905,366 B2
Chen et al.  (45) Date of Patent: Dec. 9, 2014

(54) BACK FRAME MODULE

(71) Applicant: Aopen Inc., Taipei Hsien (TW)

(72) Inventors: Chih-Hsiung Chen, Taipei Hsien (TW);
Yao-Wen Hsu, Taipei Hsien (TW);
Shuang-Ji Jiang, Taipei Hsien (TW);
Hong-Chang Liu, Taipei Hsien (TW);
Wen-Hsi Tsai, Taipei Hsien (TW)

(73) Assignee: Aopen, Inc., New Taipei (TW)

( * ) Notice: Subject to any disclaimer, the term of this patent is extended or adjusted under 35 U.S.C. 154(b) by 0 days.

(21) Appl. No.: 13/957,392

(22) Filed: Aug. 1, 2013

(65) Prior Publication Data
US 2014/0048658 A1    Feb. 20, 2014

Related U.S. Application Data

(62) Division of application No. 13/487,677, filed on Jun. 4, 2012, now Pat. No. 8,523,132, which is a division of application No. 12/386,683, filed on Apr. 22, 2009, now Pat. No. 8,191,837.

(51) Int. Cl.
*A47F 5/00* (2006.01)
*G06F 1/16* (2006.01)

(52) U.S. Cl.
CPC .......... *G06F 1/1607* (2013.01); *Y10S 248/918* (2013.01)
USPC ..................... 248/309.1; 248/176.1; 248/918; 361/679.31; 361/679.02; 312/208.1

(58) Field of Classification Search
USPC ............ 248/346.07, 924, 918, 201, 645, 448, 248/149, 220.21, 121, 274.1, 284.1, 285.1, 248/309.1, 176.1, 300, 200, 205.1, 917, 248/919, 920, 921, 922, 923; 361/679.02, 361/679.21, 679.23, 679.31, 679.32, 361/679.59; 312/208.1, 208.4
See application file for complete search history.

(56) References Cited

U.S. PATENT DOCUMENTS 5,097,388 A   3/1992  Buist et al.
5,588,621 A   12/1996 Collins et al.
(Continued)

FOREIGN PATENT DOCUMENTS

CN   2547232 Y   4/2003
CN   2731525 Y   10/2005
(Continued)

OTHER PUBLICATIONS

Office Action issued on Dec. 27, 2010 by the Chinese Patent Office for counterpart Chinese patent application No. 200810125103.5.
(Continued)

*Primary Examiner* — Kimberly Wood
(74) *Attorney, Agent, or Firm* — John A. Fortkort; Fortkort & Houston P.C.

(57) ABSTRACT

A back frame module includes a base plate, two locking plate members, a cable organizing plate, and a stowage plate. The base plate is adapted to be provided on a rear face of a display. The locking plate members, the cable organizing plate, and the stowage plate are selectively connected to the base plate. The locking plate members are adapted for mounting of a computer device therebetween. The cable organizing plate is adapted to stow a cable of the display or of the computer device. The stowage plate is adapted to stow an adapter of the display or other accessories. The locking plate members, the cable organizing plate, and the stowage plate can be selectively substituted by a support plate. The back frame module thus has various states of use to satisfy different user requirements.

2 Claims, 10 Drawing Sheets

(56) References Cited

U.S. PATENT DOCUMENTS

| | | |
|---|---|---|
| 6,520,605 B2 | 2/2003 | Nunokawa et al. |
| 6,559,829 B1 | 5/2003 | Matsuo et al. |
| 6,680,843 B2 | 1/2004 | Farrow et al. |
| 6,909,598 B2 | 6/2005 | Cheng et al. |
| 7,070,156 B2 | 7/2006 | Liao |
| 7,300,029 B2 | 11/2007 | Petrick et al. |
| 7,398,949 B2 | 7/2008 | Weech et al. |
| 7,530,538 B2 | 5/2009 | Whalen et al. |
| 7,537,189 B2 | 5/2009 | Jung et al. |
| 7,548,416 B2 | 6/2009 | Lin et al. |
| 7,551,432 B1 | 6/2009 | Bockheim et al. |
| 7,607,625 B2 | 10/2009 | Wang |
| 7,719,832 B2 | 5/2010 | Kobara et al. |
| 7,857,270 B2 | 12/2010 | Short et al. |
| 7,918,426 B2 | 4/2011 | Short et al. |
| 7,997,211 B2 | 8/2011 | Peterson et al. |
| 8,191,837 B2 | 6/2012 | Chen et al. |
| 2005/0211861 A1 | 9/2005 | Lee et al. |
| 2006/0284031 A1 | 12/2006 | Whalen et al. |
| 2008/0017760 A1 | 1/2008 | Larsen et al. |
| 2008/0035813 A1 | 2/2008 | O'Keene et al. |
| 2008/0111032 A1 | 5/2008 | Yang et al. |
| 2008/0192418 A1 | 8/2008 | Zambelli et al. |

FOREIGN PATENT DOCUMENTS

| | | |
|---|---|---|
| CN | 2898920 Y | 5/2007 |
| DE | 100 29 850 | 12/2001 |
| TW | 526936 | 4/2003 |
| TW | M307274 | 3/2007 |

OTHER PUBLICATIONS

Office Action issued on Dec. 21, 2010 by the Chinese Patent Office for counterpart Taiwanese patent application No. 097120559.

Office Action issued by the Chinese Intellectual Property Office on Mar. 19, 2012 for corresponding Chinese patent application No. 2008-101251035.

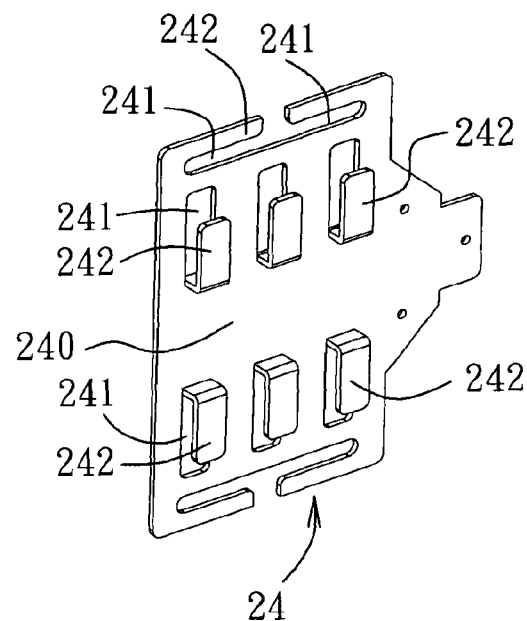
F I G. 6
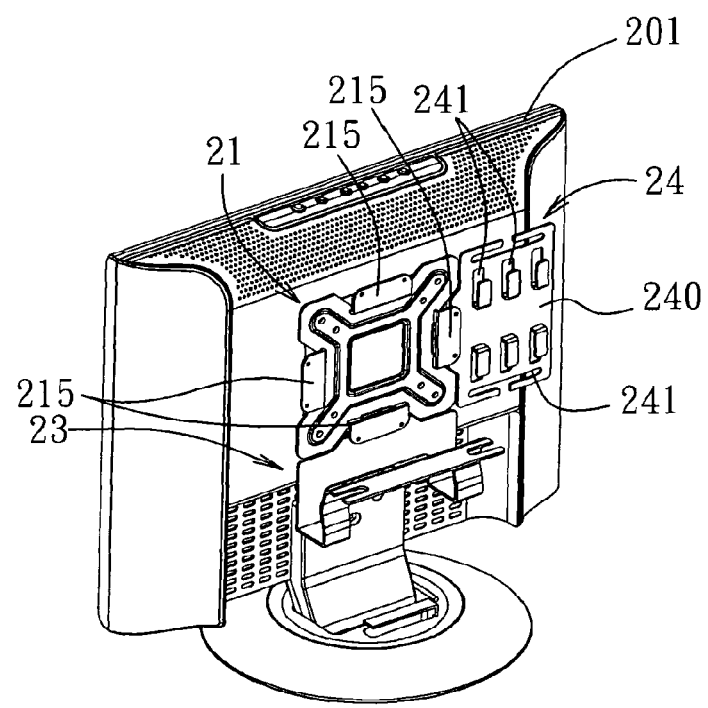
F I G. 7

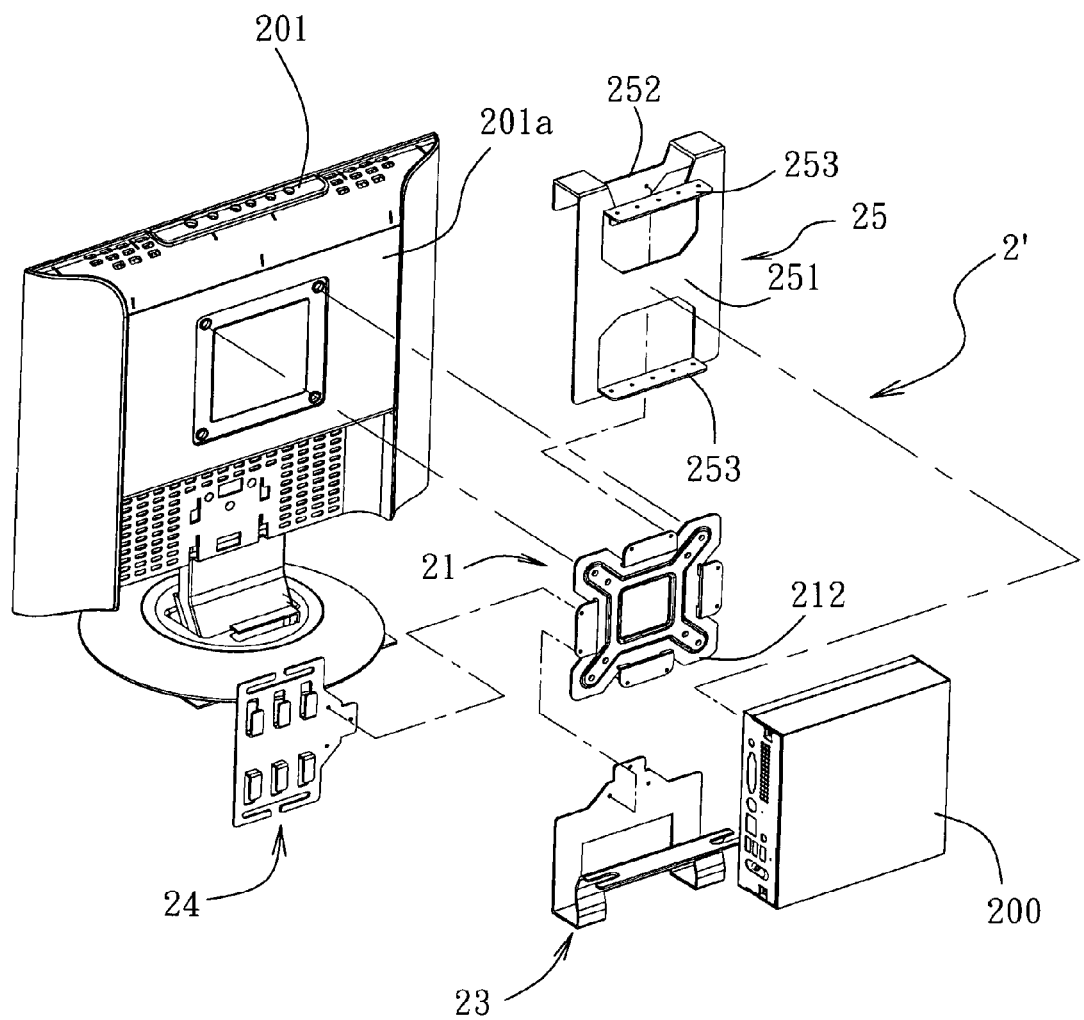
F I G. 8

BACK FRAME MODULE

CROSS-REFERENCE TO RELATED APPLICATION

This application claims priority of Taiwanese Application No. 097120559, filed on Jun. 3, 2008.

BACKGROUND OF THE INVENTION

1. Field of the Invention

The invention relates to a back frame module, more particularly to a back frame module for use in a display.

2. Description of the Related Art

Currently, some display devices can be used in a suspended state, and they are generally suspended from a wall or a ceiling through a suspending frame. A rear face of the display device and the suspending frame are both provided with VESA mounting holes, so that the mounting holes thereof are of the same industry standard.

Reference is made to FIGS. 1 and 2. FIG. 2 shows a commercially available mounting frame 11 (Sonnet MacCuff™ mini). The mounting frame 11 has a generally box-shaped structure, and is disposed to hold and secure a computer device 12 (e.g., a Mac® Mini PC) therein. The mounting frame 11 is provided with mounting holes 111 corresponding to VESA mounting holes provided in a rear face of a display 13 for locking to the rear face of the display 13. Thus, the computer device 12 can be positioned on the rear face of the display 13 to save desk space.

However, the mounting frame 11 is disadvantageous in that, since it has a fixed structure, it can accommodate only a single size of the computer device 12. The applicability of the mounting frame 11 is therefore low.

In addition, when the computer device 12 is secured to the rear face of the display 13, cables of the computer device 12 and the display 13 inevitably will be in a clutter. Moreover, since the mounting frame 11 does not have any cable organizing feature, in order that the overall appearance will not be adversely affected, the user may need to add a cable organizing mechanism, which may be an additional burden on the part of the user.

Furthermore, if the mounting frame 11 is locked to the rear face of the display 13, the VESA mounting holes in the rear face of the display 13 are used for connection with the mounting frame 11, so that the display 13 has no more VESA holes available for connection with matching VESA mounting holes in a suspending frame, and hence cannot be suspended. Accordingly, one can only choose to suspend the display 13 or secure the computer device 12 to the rear face of the display 13 using the mounting frame 11.

Given the above, the mounting frame 11 is inadequate in functionality and is limited in use.

SUMMARY OF THE INVENTION

Therefore, an object of the present invention is to provide a back frame module. The back frame module is for mounting to a rear face of a display, and has modularized components with various functions, which can be selectively used depending on actual needs of the user.

Another object of the present invention is to provide a back frame module which enables a computer device (such as a mini PC) to be mounted to a rear face of a display while permitting mounting of the display in a suspended fashion.

Accordingly, the back frame module of this invention includes a base plate, a support plate and two first locking plates. The support plate has a first plate portion and a second plate portion extending forwardly from the first plate portion. The second plate portion is locked to the base plate. The two first locking plates are provided on the first plate portion and are spaced apart from each other for mounting of a computer device between the two first locking plates.

According to a preferred embodiment of this invention, the support plate further has a cable organizing plate portion connected to the first plate portion. The cable organizing plate portion is indented to form a plurality of cable organizing slots for stowing a cable of a display or of the computer device.

According to a preferred embodiment of this invention, the support plate further has a first partition and a second partition that extend rearwardly from the first plate portion and that are spaced apart with one on top of the other. The first and second partitions define a stowage groove therebetween for stowing an adapter of the display or other accessories.

According to a preferred embodiment of this invention, the second partition has two lateral edges that are respectively indented to form cable organizing slots, respectively, for winding of a cable of the display or of the computer device around the two cable organizing slots.

According to a preferred embodiment of this invention, the two first locking plates extend rearwardly from the first plate portion of the support plate, and are connected integrally to the first plate portion.

According to a preferred embodiment of this invention, the base plate has at least one set of VESA standard mounting holes or any two sets of VESA 75, VESA 100 and VESA standard mounting holes.

The back frame module of this invention includes a base plate and two locking plate members. Each of the locking plate members has a first locking plate. The two locking plate members are disposed to be connected to the base plate such that the first locking plates are spaced apart from each other for mounting of the computer device between the first locking plates.

According to a preferred embodiment of this invention, the two locking plate members are locked to the base plate such that a distance between the first locking plates thereof is adjustable.

According to a preferred embodiment of this invention, the back frame module further includes a cable organizing plate disposed to be connected to the base plate for stowing a cable of the display or of the computer device. The cable organizing plate includes a first plate portion and a plurality of stop elements. Each of the stop elements is generally L-shaped, and has one end connected to the first plate portion of the cable organizing plate, and another end spaced apart from the first plate portion of the cable organizing plate so as to define a cable organizing groove with the first plate portion of the cable organizing plate.

According to a preferred embodiment of this invention, the back frame module further includes a stowage plate for coupling to the base plate and located below the first locking plates. The stowage plate includes a first plate portion that has a bent and substantially U-shaped structure which defines a stowage groove for stowing an adapter of the display. The first plate portion of the stowage plate further has two spaced-apart plate sections. One of the plate sections is secured to the base plate and the other of the plate sections is spaced apart from the base plate to define the stowage groove. The stowage plate further includes an extension plate portion extending rearwardly from the other of the plate sections which is spaced apart from the base plate. The extension plate portion has two ends that are respectively indented to form cable organizing slots, respectively, for winding of a cable of the display or of the computer device around the cable organizing slots in the ends of the extension plate portion.

In the back frame module according to this invention, combinations of components of the back frame module may be varied depending on user requirements so as to provide different functions. For example, the base plate may be used in conjunction with the cable organizing plate, or with the stowage plate, or with the support plate.

Through the modularized design of the back frame module of this invention, different sizes of computer devices may be mounted thereto. In addition, the components of the back frame module may be assembled selectively depending on user requirements to form different functional combinations, so that the user is provided with a wider range of functionalities and does not need to buy additional accessories. Furthermore, the back frame module allows the user to secure the computer device to the rear face of the display to save space while permitting the display to be secured to a suspending frame for suspension purposes, thereby enhancing user convenience.

BRIEF DESCRIPTION OF THE DRAWINGS

Other features and advantages of the present invention will become apparent in the following detailed description of the preferred embodiments with reference to the accompanying drawings, of which:

FIG. 6 is a perspective view of a cable organizing plate to be selectively included in the first preferred embodiment;

FIG. 7 is a perspective view of the first preferred embodiment including the cable organizing plate;

FIG. 8 is an exploded perspective view of the second preferred embodiment of a back frame module according to the present invention;

DETAILED DESCRIPTION OF THE PREFERRED EMBODIMENTS

Figure 1:
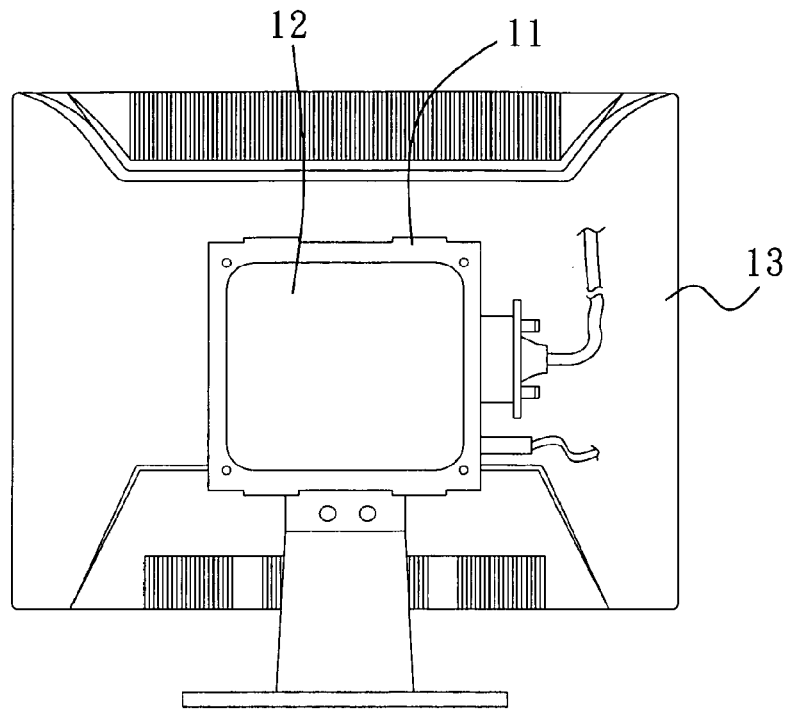
FIG. 1 is an elevational plan view to illustrate a commercially available Sonnet MacCuff™ mini mounting frame assembled to a rear face of a display.
Figure 2:
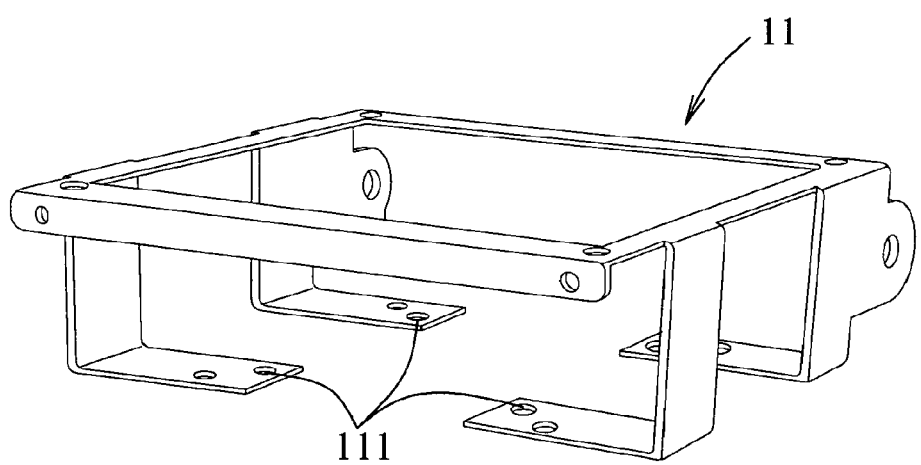
FIG. 2 is a perspective view of the Sonnet MacCuff™ mini mounting frame.

Before the present invention is described in greater detail, it should be noted that like elements are denoted by the same reference numerals throughout the disclosure.

Figure 3:
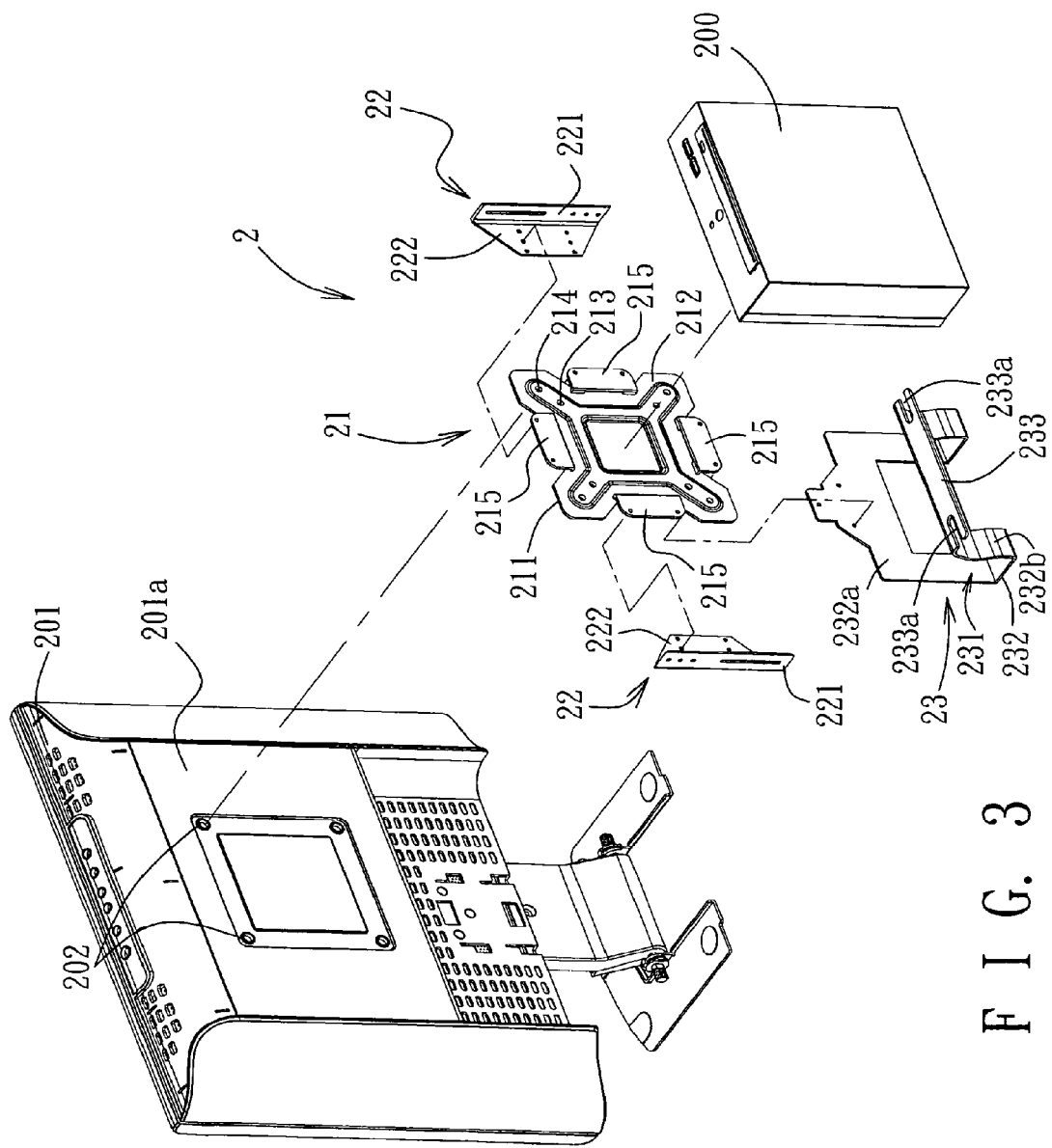
FIG. 3 is an exploded perspective view of the first preferred embodiment of a back frame module according to the present invention.
Figure 4:
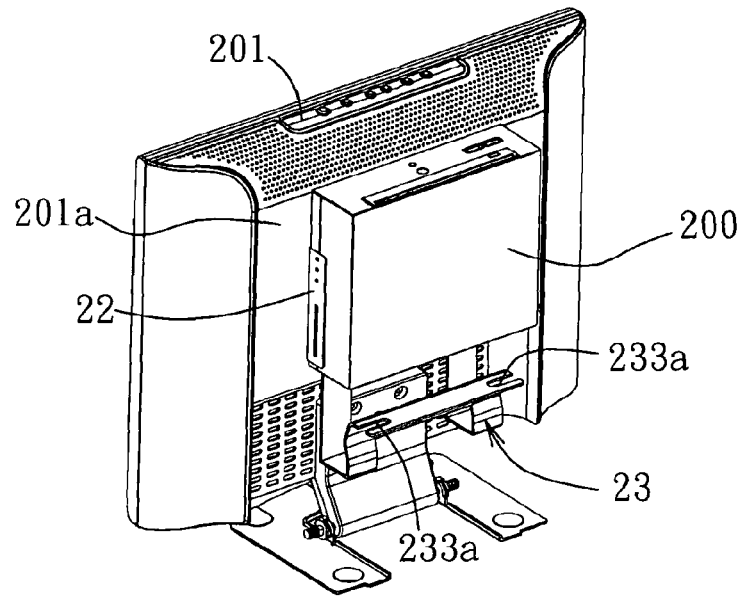
FIG. 4 is a perspective view of the first preferred embodiment when assembled to a rear face of a display.
Figure 5:
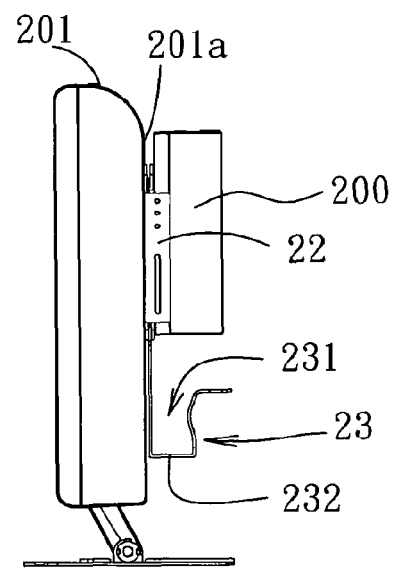
FIG. 5 is a side view of the first preferred embodiment when assembled to the rear face of the display.

Referring to FIGS. 3 to 5, the first preferred embodiment of a back frame module 2 according to the present invention includes a base plate 21, two locking plate members 22, and a stowage plate 23. In the first preferred embodiment, the back frame module 2 allows a computer device 200 to be positioned on a rear face (201a) of a display 201. In addition, the rear face (201a) of the display 201 is provided with VESA mounting holes 202. The computer device 200 referred to herein is a mini PC.

The base plate 21 is a generally rectangular plate, and has a front face 211, a rear face 212, a set of VESA 75 mounting holes 213, and a set of VESA 100 mounting holes 214. The VESA 100 mounting holes 214 are used to correspond to the VESA mounting holes 202 in the rear face (201a) of the display 201, so that the base plate 21 can be locked to the rear face (201a) of the display 201. The base plate 21 has upper, lower, left, and right edges that are respectively formed with locking tabs 215.

Each of the locking plate members 22 includes first and second locking plates 221, 222 that are connected in a generally perpendicular relationship. Each of the first and second locking plates 221, 222 is provided with a plurality of mounting holes. By locking the second locking plates 222 of the two locking plate members 22 to the base plate 21, the first locking plates 221 can be connected to the rear face 212 of the base plate 21.

The stowage plate 23 includes a first plate portion 232 that has a bent and generally U-shaped structure and that defines a stowage groove 231, and an extension plate portion 233. The first plate portion 232 has two spaced-apart plate sections (232a, 232b). The stowage plate 23 is connected to the base plate 21 by securing the plate section (232a) to the base plate 21 such that the plate section (232b) of the first plate portion 232 is spaced apart from the rear face 212 of the base plate 21. The extension plate portion 233 extends rearwardly from the plate section (232b) of the first plate portion 232 which is spaced apart from the rear face 212 of the base plate 21. The extension plate portion 233 has two ends that are respectively indented to form generally U-shaped cable organizing slots (233a), respectively, the function of which will be described hereinbelow.

The two locking plate members 22 and the stowage plate 23 are assembled to the base plate 21 by first locking the two locking plate members 22 respectively to the locking tabs 215 at the left and right edges of the base plate 21 such that the first locking plates 221 of the two locking plate members 22 are spaced apart from each other on the rear face 212 of the base plate 21, thereby permitting the computer device 200 to be locked between the two first locking plates 221 and to be secured to the rear face (201a) of the display 201. The stowage plate 23 is locked to the locking tab 215 at the lower edge of the base plate 21 so as to be positioned below the two locking plate members 22 with an opening of the stowage groove 231 facing upwardly. The stowage groove 231 is adapted for accommodating, for example, an adapter (not shown) of the display 201, or accessories (not shown) of the computer device 200. A cable of the display 201 or of the computer device 200 may be wound around the cable organizing slots (233a) in the extension plate portion 233, so that the cables of the display 201 and the computer device 200 will not get entangled and form a messy sight that adversely affects the overall appearance.

A plurality of pairs of mounting holes may be provided in the second locking plates 222 of the two locking plate members 22 or the locking tabs 215 at the left and right edges of the base plate 21 (the mounting holes are formed in the second locking plates 222 of the two locking plate members 22 in this embodiment), so that the distance or width between the first locking plates 221 of the two locking plate members 22 disposed to be locked to the base plate 21 can be adjusted as the situation dictates to permit mounting of the computer device 200 of a different size.

Referring to FIG. 6, in the first preferred embodiment, the back frame module 1 may further include a cable organizing plate 24 formed with a plurality of cable organizing grooves 241. Specifically, the cable organizing plate 24 has a first plate portion 240 and a plurality of stop elements 242. Each of the stop elements 242 is generally L-shaped, and has one end connected to the first plate portion 240, and another end spaced apart from the first plate portion 240 so as to define a respective one of the cable organizing grooves 241 with the first plate portion 240. In this embodiment, some of the stop elements 242 are connected to upper or lower edges of the first plate portion 240 so as to define the respective ones of the cable organizing grooves 241 with the upper or lower edges of the first plate portion 240. Other ones of the stop elements 242 are connected to a plate surface of the first plate portion 240 so as to define the respective ones of the cable organizing grooves 241 with the plate surface of the first plate portion 240.

Referring to FIGS. 3, 6 and 7, with the additional provision of the cable organizing plate 24 in the back frame module 2, the base plate 21, aside from being usable in conjunction with the two locking plate members 22 and the stowage plate 23 as shown in FIG. 3, may be used in conjunction with the cable organizing plate 24 and the stowage plate 23, as shown in FIG. 7, in which the cable organizing plate 24 is locked to one of the locking tabs 215 at the left and right edges of the base plate 21 so that the cable of the display 201 may be wound around the corresponding ones of the stop elements 242 defining the cable organizing grooves 241. As for the stowage plate 23, it is locked to the locking tab 215 at the lower edge of the base plate 21 in the same manner as described in connection with FIG. 3, for accommodating, for example, an adapter (not shown) of the display 201.

Alternatively, referring to FIGS. 3 and 6, when the two locking plate members 22 and the stowage plate 23 are locked to the base plate 21, the cable organizing plate 24 can be locked to the locking tab 215 at the upper edge of the base plate 21, so that the back frame module 2 has the functions of securing the computer device 200, organizing cables and stowing articles. Alternatively, the two locking plate members 22, the cable organizing plate 24, and the stowage plate 23 may be separately locked to the base plate 21, so that the back frame module 2 has the function of securing the computer device 200, organizing cables, or stowing, for example, an adapter of the display 201.

Figure 9:
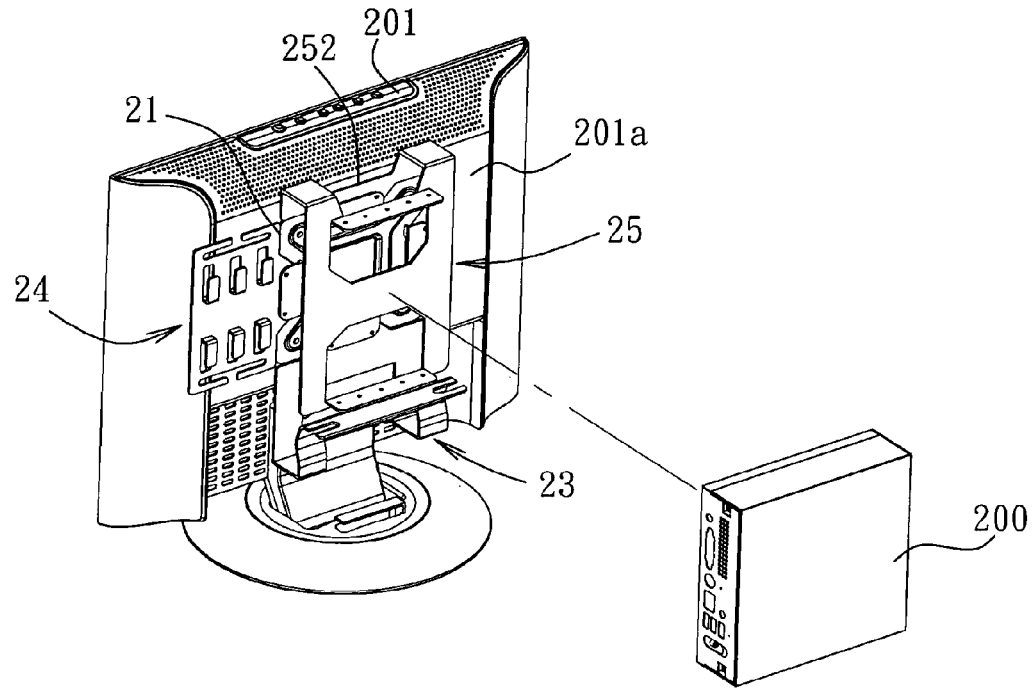
FIG. 9 is a perspective view of the second preferred embodiment when assembled to a rear face of a display.
Figure 10:
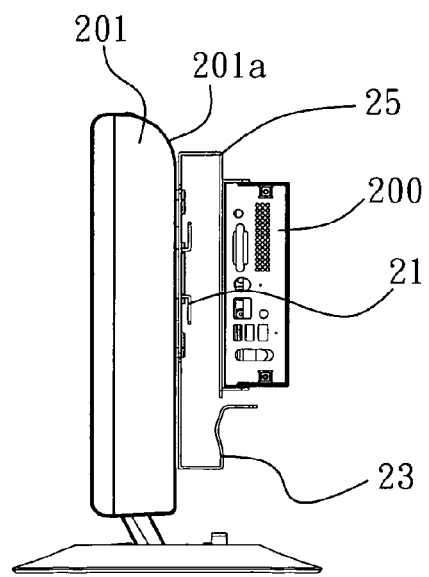
FIG. 10 is a side view of the second preferred embodiment when assembled to the rear face of the display.

Referring to FIGS. 8 to 10, the second preferred embodiment of a back frame module 2' according to the present invention further comprises a support plate 25 in addition to the base plate 21, the stowage plate 23, and the cable organizing plate 24, but excluding the two locking plate members 22 of the first preferred embodiment. In this embodiment, the base plate 21, the cable organizing plate 24, and the stowage plate 23 are of the same structure and are assembled in the same way as those in the first preferred embodiment, and will not be described in greater detail herein for the sake of brevity.

The support plate 25 includes a first plate portion 251, and a second plate portion 252 and two first locking plates 253 connected to the first plate portion 251. The first plate portion 251 as a whole is elongated in shape. The second plate portion 252 extends forwardly from a top edge of the first plate portion 251, and is generally L-shaped. The two first locking plates 253 extend transversely and rearwardly from the first plate portion 251, and are spaced apart with one on top of the other. In practice, the two first locking plates 253 are formed by cutting portions of the first plate portion 251 and by bending the cut portions rearwardly. Therefore, the two first locking plates 253 and the first plate portion 251 are connected integrally. Certainly, in other embodiments of this invention, the two locking plates 253 may be formed as separate components like the locking plate members 22 of the first preferred embodiment for locking or connecting to the support plate 25, and may be configured to have mounting holes like the locking plate members 22 of the first preferred embodiment so as to be adjustable in position and to be locked to the first plate portion 251 of the support plate 25 for accommodating the computer device 200 of a different size.

When the base plate 21 is locked to the rear face (201a) of the display 201, the support plate 25 can be locked to the base plate 21 through the second plate portion 252 such that the first plate portion 251 of the support plate 25 is spaced apart from the rear face 212 of the base plate 21. The computer device 200 can then be locked between the two first locking plates 253.

It is apparent from the foregoing that the second preferred embodiment differs from the first preferred embodiment in the structure for mounting the computer device 200. However, the back frame module 2' as a whole can likewise achieve the same effects as the back frame module 2 according to the first preferred embodiment.

It is further noted that if the back frame module 2' is adapted to be mounted to a desk-top display 201, the base plate 21 is locked directly to the rear face (201a) of the display 201 via the VESA mounting holes 202.

Figure 11:
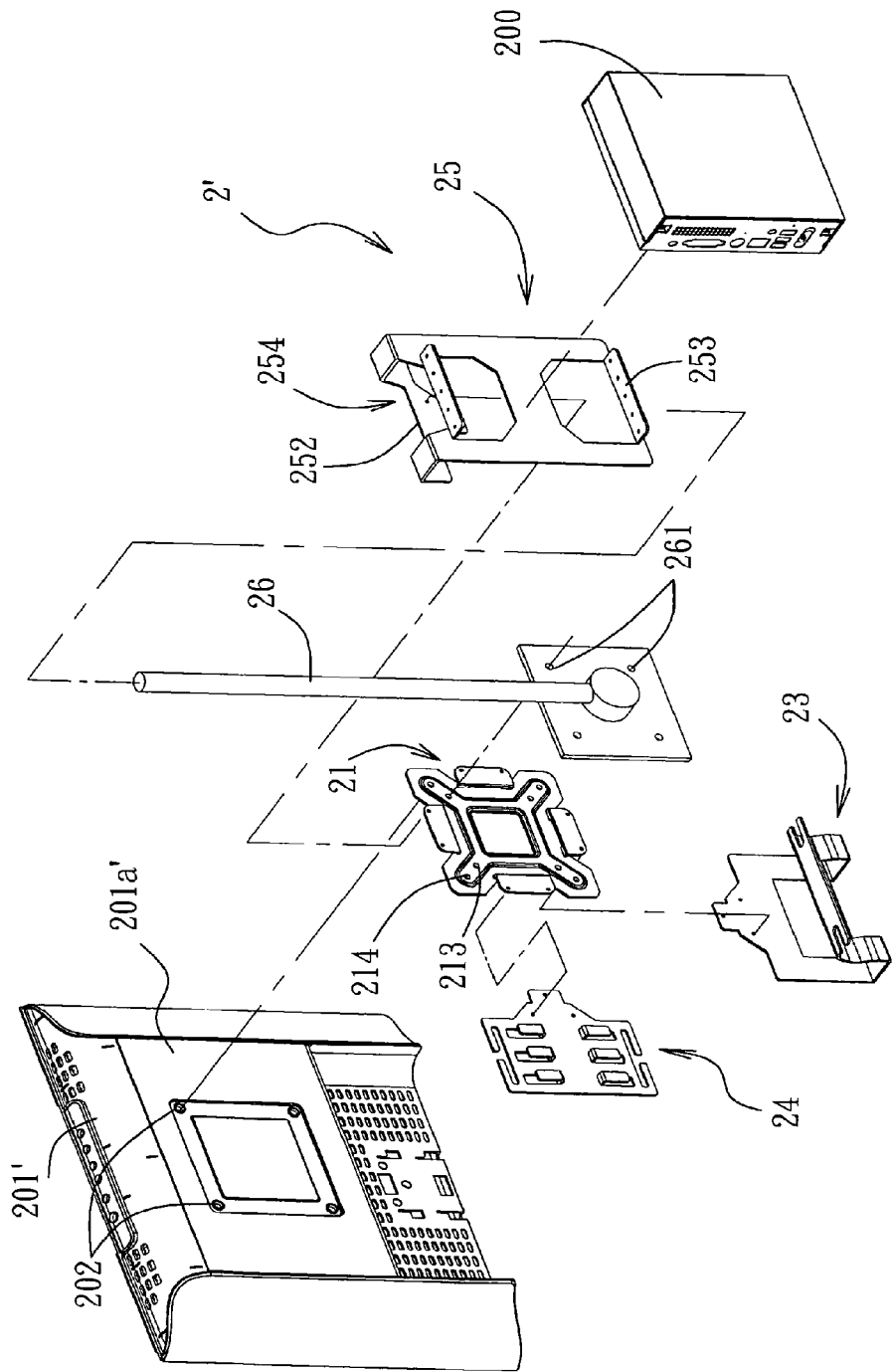
FIG. 11 is an exploded perspective view of the second preferred embodiment when used in a suspending type display.
Figure 12:
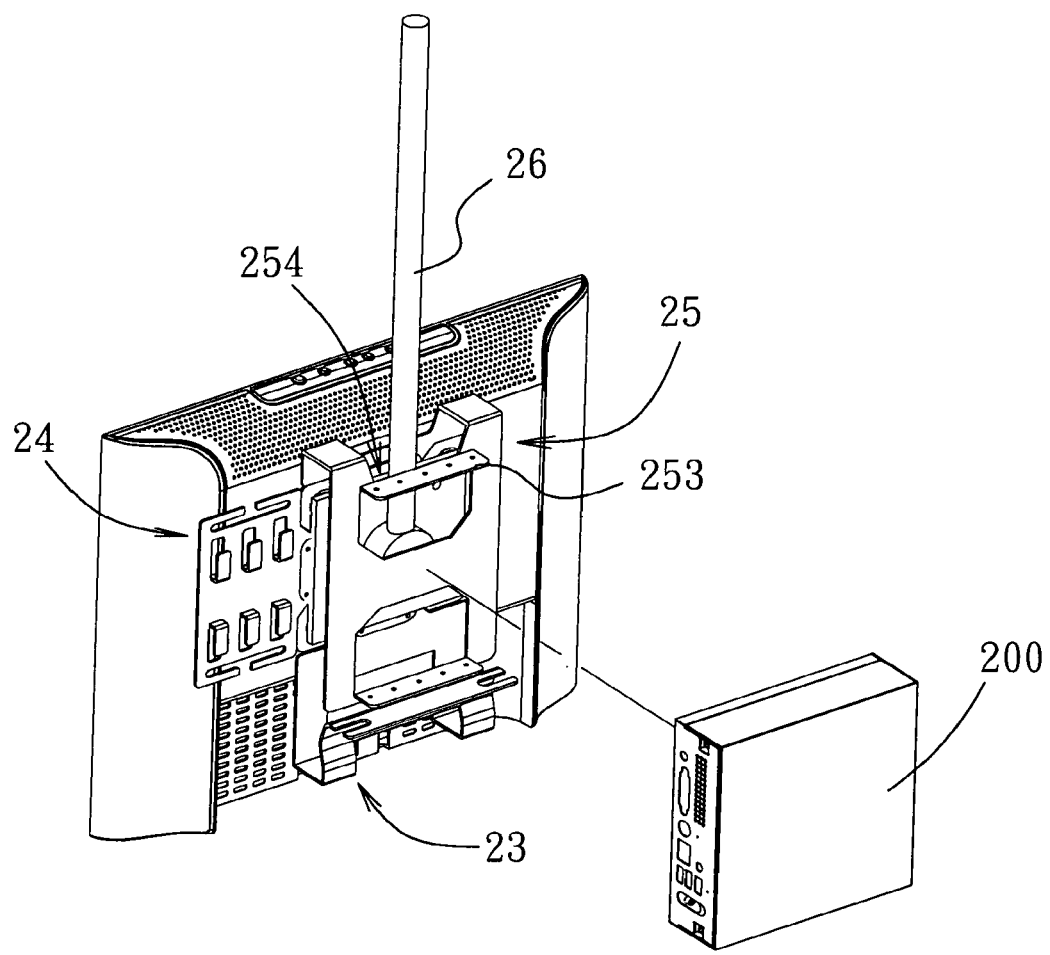
FIG. 12 is a perspective view of the second preferred embodiment when assembled to the suspending type display.
Figure 13:
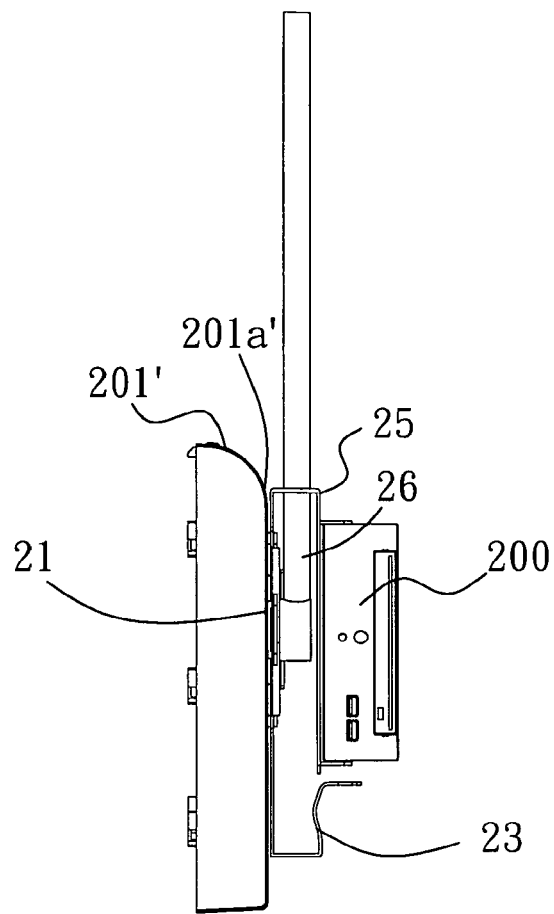
FIG. 13 is a side view of the second preferred embodiment when assembled to the suspending type display.

Referring to FIGS. 11 to 13, if the back frame module 2' according to the second preferred embodiment is adapted for use with a suspending type display 201', since the display 201' is suspended through a suspending frame 26, the base plate 21 is locked between the rear face (201a') of the display 201' and the suspending frame 26, in which the base plate 21 and the display 201' are connected via the VESA 100 mounting holes 214, 202 respectively provided therein, and the base plate 21 and the suspending frame 26 are connected via the VESA 75 mounting holes 213, 261 respectively provided therein. Thus, both the computer device 200 and the suspending frame 26 can be connected to the rear face (201a') of the display 201' at the same time. In other words, in this embodiment, the base plate 21 is locked to the display 201' and the suspending frame 26, respectively, through the two sets of VESA mounting holes 213, 214 therein. In practice, if the base plate 21 is provided with only one set of VESA mounting holes, the suspending frame 26 and the base plate 21 are both locked to the display 201'. It is noted that, in this embodiment, the second plate portion 252 of the support plate 25 is provided with an opening 254 for passage of the suspending frame 26 therethrough.

Figure 14:
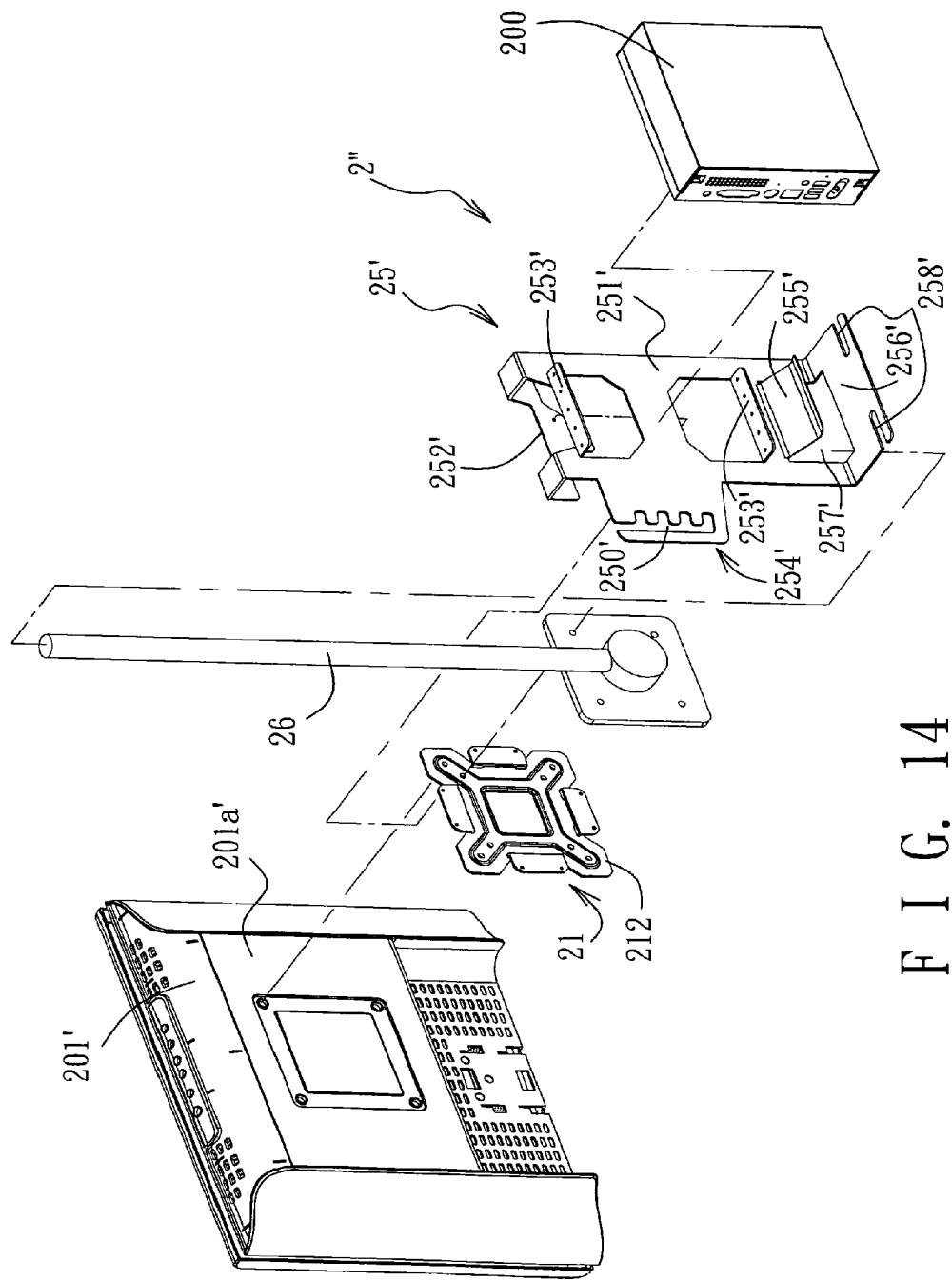
FIG. 14 is an exploded perspective view of the third preferred embodiment of a back frame module according to the present invention.

Referring to FIG. 14, the third preferred embodiment of a back frame module 2" according to the present invention is shown to include the aforesaid base plate 21 and a support plate 25'.

Since the base plate 21 is substantially the same as that of the second preferred embodiment in terms of structure and manner of assembly, it will not be discussed further herein.

The support plate 25' includes a first plate portion 251', and a second plate portion 252', two first locking plates 253', a cable organizing plate portion 254', a first partition 255', and a second partition 256' connected to the first plate portion 251'. The first plate portion 251', the second plate portion 252', and the two first locking plates 253' are substantially the same as those of the support plate 25 of the second preferred embodiment in structure. The cable organizing plate portion 254' is connected integrally to a lateral edge of the first plate portion 251', and is indented to form a plurality of cable organizing slots 250' that are inter-communicated. The first partition 255' and the second partition 256' extend transversely and rearwardly from the first plate portion 251', are spaced apart from each other with one on top of the other, and are located below the two first locking plates 253'. The first partition 255' and the second partition 256' define a stowage groove 257' therebetween. Left and right lateral edges of the second partition 256' are respectively indented to form U-shaped cable organizing slots 258', respectively.

The support plate 25' is assembled in the same manner as that described in the second preferred embodiment. The two first locking plates 253' are adapted for mounting the computer device 200 therebetween. The cable organizing slots 250' in the cable organizing plate portion 254' are adapted for stowing a cable of the computer device 200 or of the display 201'. The stowage groove 257' between the first partition 255' and the second partition 256' is adapted for stowing an adapter (not shown) of the display 201' or accessories (not shown) of the computer device 200.

In this embodiment, the functions of securing the computer device 200, organizing cables, and stowing an adapter (not shown) of the display 201' are those of the support plate 25'. However, in other embodiments of this invention, the aforesaid functional structures of the support plate 25' may have different combinations and may be configured to provide such functions in conjunction with other components of the first preferred embodiment of the back frame module 2 depending on user requirements.

In the three preferred embodiments described hereinabove, connection of the components (such as the locking plate members 22, the support plate 25, 25', the cable organizing plate 24, and the stowage plate 23) of the back frame module 2, 2', 2'' to the base plate 21 is realized using screw fasteners (not shown), and may be accomplished using conventional means of releasable engagement in other embodiments of the invention.

As illustrated, by virtue of the configuration of the modularized components of the back frame module 2, 2', 2'', the two first locking plates 221, 253 permit adjustment of the distance therebetween so as to accommodate computer devices 200 of different sizes. In addition, since the components of the back frame module 2, 2', 2'' may be assembled selectively depending on user requirements to provide different functional combinations, the back frame module 2, 2', 2'' does not merely have the function of securing the computer device 200, and can provide the user with a wider range of functionalities in use, so that the user does not need to buy additional accessories. Furthermore, with the arrangement of the back frame module 2, 2', 2'' to allow the user to secure the computer device 200 to the rear face (201a, 201a') of the display 201, 201', not only can the space occupied by the computer device 200 be reduced, the display 201, 201' can also be mounted to the suspending frame 26 so as to be capable of being suspended. Moreover, such can be achieved with the use of only the set of VESA mounting holes 202 in the rear face (201a', 201a') of the display 201, 201', thereby enhancing user convenience.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A back frame module, comprising:
a base plate;
a support plate having a first plate portion and a second plate portion extending forwardly from said first plate portion, said second plate portion being locked to said base plate; and
two first locking plates provided on said first plate portion and spaced apart from each other for mounting of a computer device between said first locking plates;
wherein said first locking plates extend rearwardly from said first plate portion and are connected integrally to said first plate portion,
wherein said support plate further has a cable organizing plate portion connected to said first plate portion, said cable organizing plate portion being indented to form a plurality of cable organizing slots; and
said support plate further has a first partition and a second partition that extend rearwardly from said first plate portion and that are spaced apart with one on top of the other, said first and second partitions defining a stowage groove therebetween.

2. The back frame module according to claim 1, wherein said second partition has two lateral edges that are respectively indented to form cable organizing slots, respectively.

* * * * *